INVENTOR.
Roland P. Hammond

Sept. 19, 1967   R. P. HAMMOND   3,342,697
MULTISTAGE FLASH EVAPORATOR
Filed July 28, 1964   3 Sheets-Sheet 3

INVENTOR.
Roland P. Hammond
BY Roland G. Anderson
ATTORNEY.

United States Patent Office 3,342,697
Patented Sept. 19, 1967

3,342,697
MULTISTAGE FLASH EVAPORATOR
Roland P. Hammond, Oak Ridge, Tenn., assignor to the United States of America as represented by the United States Atomic Energy Commission
Filed July 28, 1964, Ser. No. 385,814
2 Claims. (Cl. 202—173)

ABSTRACT OF THE DISCLOSURE

The device constitutes a multilevel plural stage evaporator for the flash distillation of saline water, economically suited for large volume purification systems. Brine heated by a primary heat source is fed to a series of multilevel trays at one end of the evaporator shell and flows through successive stages defined by compartments formed in the common chamber of the evaporator shell at progressively lower pressures to flash and produce vapor. Condenser coils on either side of the tier of trays condense the vapor which is then collected in common troughs at the base of the shell. The feed is circulated through the condenser coils countercurrent to brine flow in the trays to serve the dual purpose of condensing the vapors and preheating the feed.

---

With the growth of population and industry and the settling and developing of arid portions of the earth, demand is increasing for additional sources of potable water. The seat offers the greatest source of water to meet these needs if it can be economically purified. Efforts at developing an economical process of desalination of water include the flash distillation, long tube vertical distillation, electrodialysis, vapor compression and freezing methods.

The potential need for desalination plants ranges from small isolated communities to large geographical areas; from domestic drinking needs to large scale industrial and agricultural use. The most immediate requirements are expected to be in the small to intermediate sizes for use in municipal and limited geographical areas. Large geographical areas such as served by reclamation type projects are expected to have firm needs within the next few years.

Where large quantities of water are required for industrial use, irrigation, or public consumption the problem is to purify the water at costs that are sufficiently low that it can compete for industrial and irrigation purposes with naturally occurring potable water conveyed from other areas. Large nuclear reactors may be attractive in reducing energy costs for the generation of electric power where the spent steam from the turbo-generators can be economically used as the energy source for the desalination of water. However, a similar reduction in costs resulting from large size in the construction, maintenance and operation of the evaporator for the desalination facilities must be attainable if cheap water from the sea is to be realized.

Applicant with a knowledge of these problems of the prior art has for an object of his invention the provision of a multilevel plural stage system for the flash distillation of saline water which has the advantage of less surface area exposed to corrosion, lower container or shell cost per unit volume, less total volume per unit of capacity, and involves lower site preparation costs, and lower pumping costs.

Applicant has as another object of his invention the provision of a multilevel horizontal flash distillation system for purifying water wherein a common collection channel collects distillate from each level of the multilevel evaporator.

Applicant has as a further object of his invention the provision of a multilevel plural stage exaporator for the flash distillation of salt water wherein the coolant from the condensers of the two upper levels of the reject stages supplies the added make-up feed for the system.

Other objects and advantages of my invention will appear from the following specification and accompanying drawings, and the novel features thereof will be particularly pointed out in the annexed claims.

Figure 1:
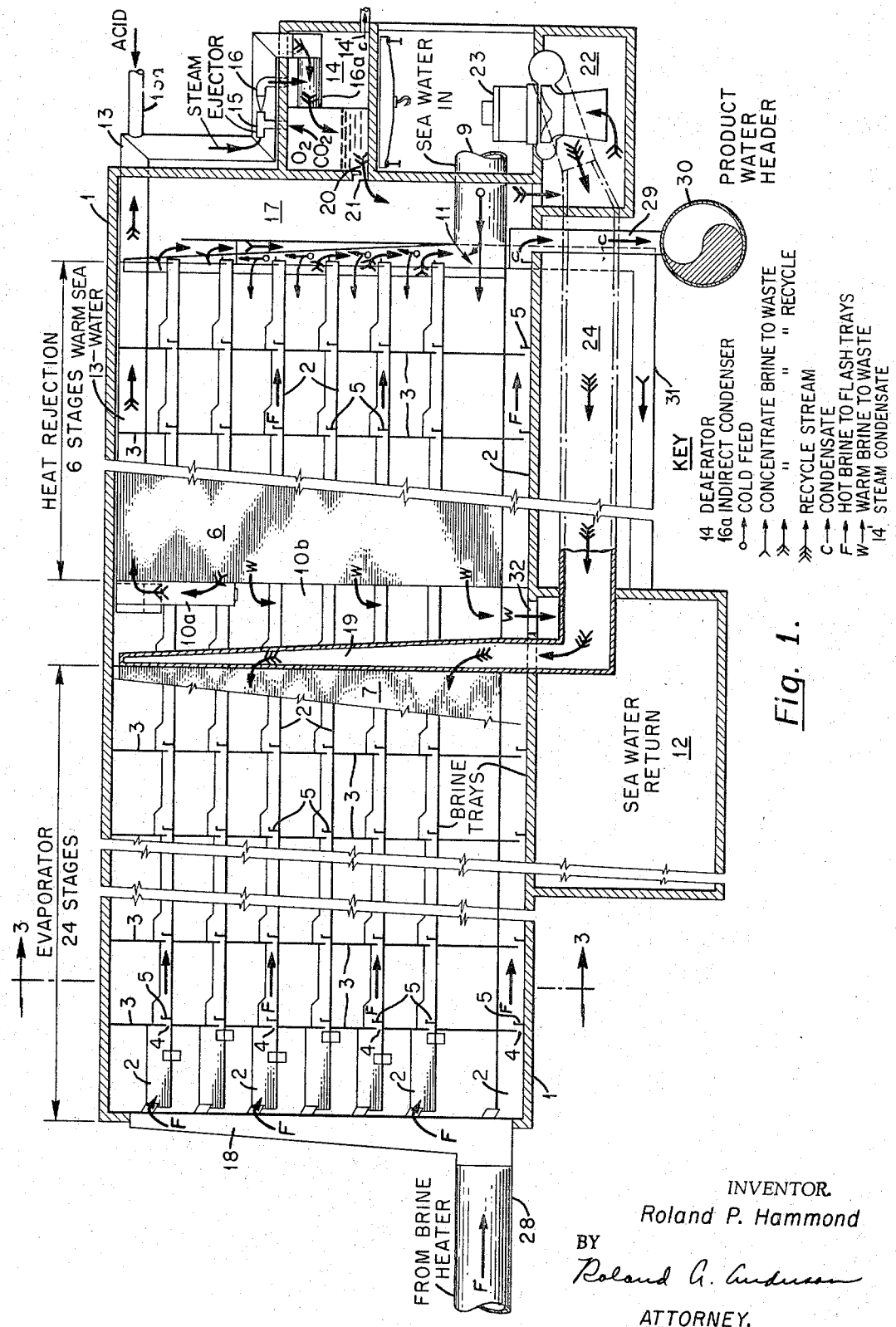
Figure 2:
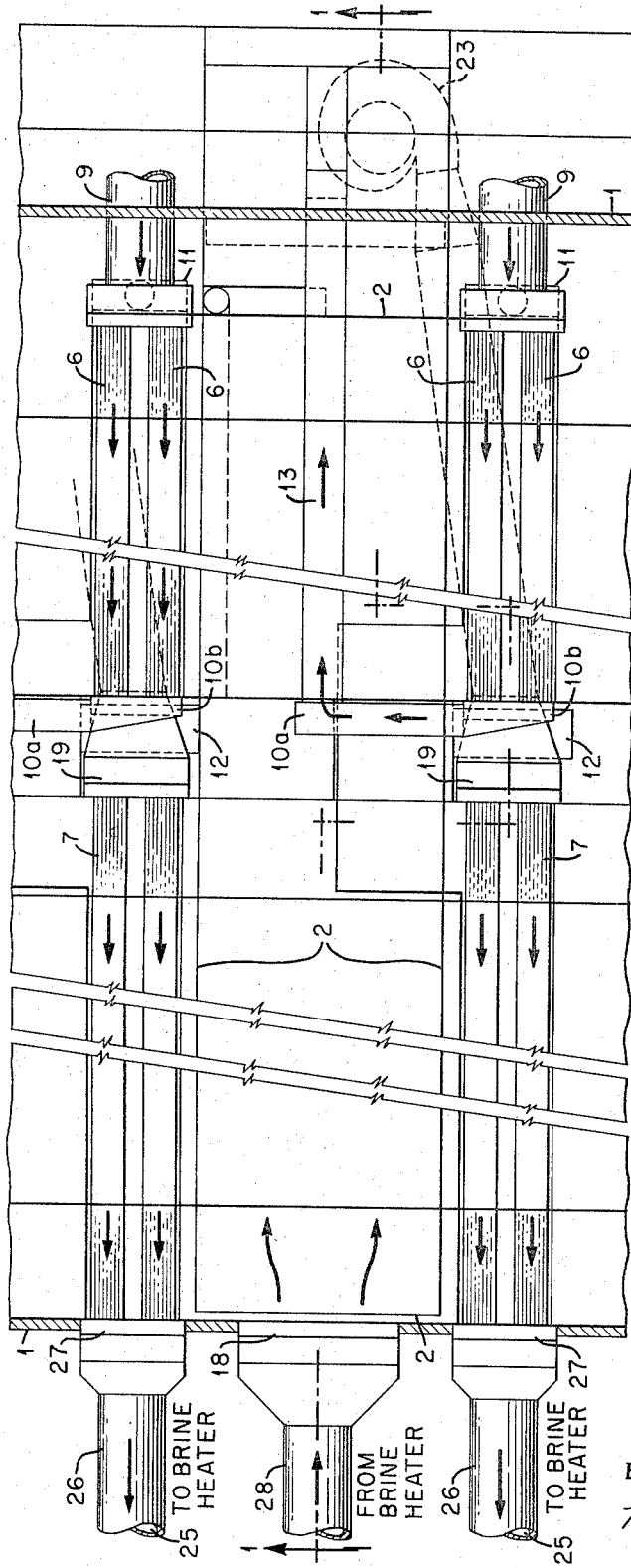
Figure 3:
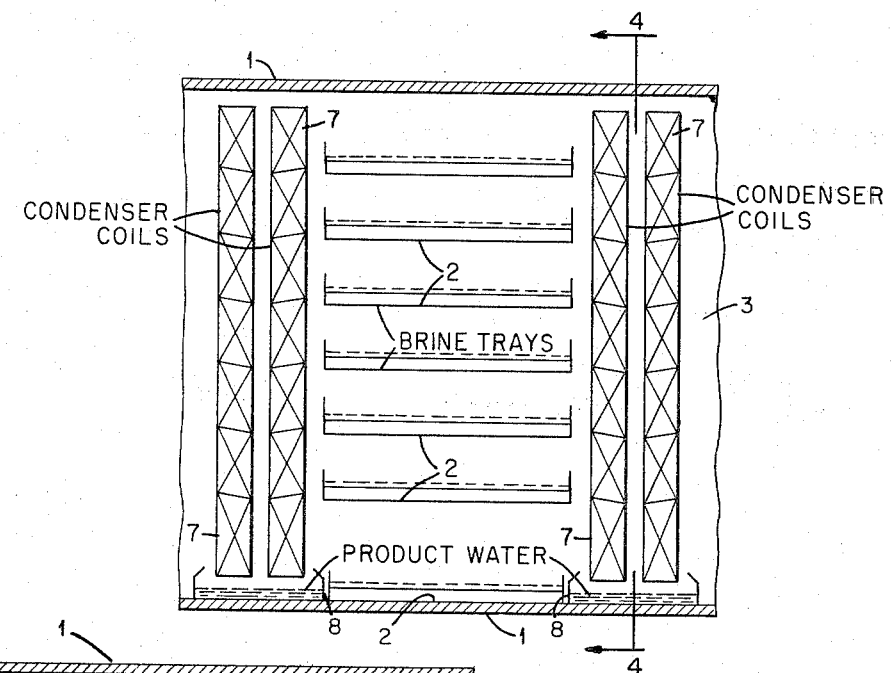
Figure 4:
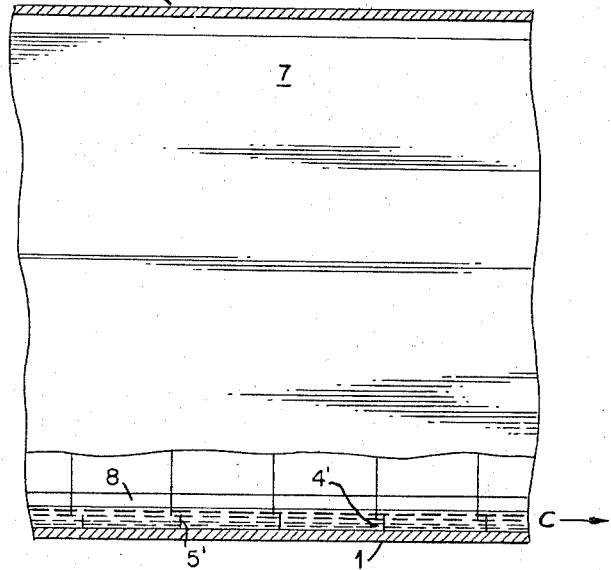

In the drawings, FIG. 1 is a fragmental longitudinal sectional elevation of my improved multilevel evaporator. FIG. 2 is a plan view of my improved evaporator with the top removed. FIG. 3 is a cross section of the same evaporator taken along the line 3—3 of FIG. 1. FIG. 4 is a sectional elevation of the same evaporator taken along the lines 4—4 of FIG. 3.

It has been suggested that the desalination of water by the flash distillation process can best be carried out in a series of horizontal stages, compartmentalized by partitioning a single structure. In this arrangement hot brine would flow in one direction through a long series of stages, cascading from stage to stage, due to the progressively lower pressure maintained in each succeeding stage. By providing openings in the partition walls below the liquid level in the brine trays and employing weirs at the entrance to each stage to maintain the liquid level in the preceding stage, the various stages can be isolated from each other, and differences in pressure can be maintained therein so that the liquid flashes each time it enters a stage.

Flowing countercurrent to the hot brine in the trays is the cool feed which is being recycled to the heat source. It flows through the horizontal tubes that extend from the last stage of the heat recovery section, and acts as condenser for cooling and condensing the vapors evolved from the flash evaporation. As it flows up the heat recovery section from stage to stage toward the heat source it gradually absorbs more and more heat from the progressively warmer vapors until it reaches the desired temperature level for feeding into the heat source.

It will be appreciated that a system of stages located on a single level and compartmentalized from each other will be very long, occupy a great deal of space, and have a large volume. The cost of preparation of the site, and the materials of construction will be great, and the piping needed for this extended structure will be expensive in capital investment, energy consumption, and maintenance.

To partially meet this problem and conserve space, it has been suggested that the evaporator might be constructed in horizontal tiers stacked one above the other. See Frankel, "Flash Evaporators for the Distillation of Sea Water," Proceedings of the Institute of Mechanical Engineers, 1960, Volume 174, pages 312–369. While this does conserve space, it will do little to conserve either materials or pumping requirements since each tier is isolated in a separate compartment and the various tiers are series connected.

Flash type distillation systems for the purification of sea water have encountered the problem of scale formation in the condenser tubes. To inhibit collection of the scale on the tube walls and insure its removal, the feed waters to the condenser are treated with $H_2SO_4$. However, where only raw sea water makes up the feed, the quantities of $H_2SO_4$ required are substantial and expensive. Therefore, it has been the practice to divide the stages into a heat absorption and a heat rejection section. See Frankel, supra, page 315, FIG. 35. The bulk of the sea water is recycled through the system, and in order to prevent large build-up of minerals therein, a portion of the spent feed is tapped off and returned to the sea. This is called blow down. The discharged portion of the feed is then replaced along with the part that is lost through distillation, by treated sea water. The treated sea water represents a portion of the water that is picked up from the sea and passed through the condenser of the last stages that comprise the heat rejection section of the system, to warm it prior to acidic treatment and mixing with the feed of the system for recycling. The advantage of recycling of the brine is that only a small amount of new feed water need be added each time for the make-up. This conserves acid and heat. See Frankel, supra. However, where steel is employed as the containment vessel, oxidation and corrosion may take place as the result of the presence of $CO_2$ and $O_2$. This may be partially overcome by removal of the $CO_2$ and $O_2$ if the new sea water is treated in a deaerator prior to make-up.

A large system of the order of 1 billion gallons per day, for the desalination of sea water, to be attractive must offer a substantial savings in costs. This is the advantage offered by the multilevel system since it may be built at lower capital cost, and permits economies to be affected in pumping and energy operating costs. The volume for a given surface of container area is much greater than for the single level flash evaporation systems. The lowest cost for the greatest volume is possible. This saving is multiplied where the hot brine evaporation trays are stacked in tiers in a single compartment or stage and where common distillate collecting troughs or channels serve all the evaporation trays of each stage. Costs can also be reduced by judicious selections of materials. While steel has formerly served as the containment vessel or shell, reinforced concrete can be constructed of an inner liner of steel and outer walls of concrete. To prevent inleakage of air, the exterior surfaces of the concrete walls of the shell are coated with neoprene or other suitable coating. The inner surfaces of the concrete shell, if not protected by a steel liner, may be otherwise reinforced and covered by a protective coating of epoxy or other suitable protective material. The reason for using a protective cover for the inner surfaces of the concrete shell is to inhibit corrosion resulting from the tendency of vapors to enter the porous concrete and leach out certain minerals. Where the steel liner is used, the epoxy or other protective coating may be dispensed with, since the steel will only be subject to nominal corrosion if the $CO_2$ and $O_2$ have been removed from the feed liquid by deaeration.

Referring now in detail to FIGS. 1–4, showing applicant's improved multilevel evaporator and flash distillation system, 1 designates the outer shell or containment vessel. Evaporation trays 2, 2 that receive the hot brine and contain it, are stacked in tiers one above the other within the shell 1 and extend substantially the full length thereof. The shell is divided into separate compartments or stages by vertical partitions 3. In one preferred embodiment, there are 30 stages where the first twenty-four are heat recovery stages, and the last six are heat rejection stages. A series of openings 4, 4 are formed in each partition in alignment with the various brine trays 2, and below the liquid level in the trays 2 in order to effectively seal off or isolate each stage from the others by forming a liquid lock. This permits the unobstructed flow of brine along the troughs from stage to stage while permitting the stages to be maintained at different pressures, i.e., progressively lower pressures from the first to the last stage. Here it should be noted that the sides of the trays 2 are higher at the entrance end of the stage than at the exit. This is made necessary by the turbulence of the brine stream as it enters each successive stage, since flashing and foaming takes place when the lower pressure is encountered at the entrance of the newly entered stage. These higher side walls tend to contain the brine and the spray at this point, and the weirs 5 act as dams and tend to keep the liquid level above the openings 4 and maintain the liquid lock.

Condenser banks 6, 6 in the heat rejection section and 7, 7 in the heat recovery section, are often called coils, and are spaced from each other, and each is comprised of a series of longitudinally extending tubes passing through the various stages and terminating in headers 27, 19, 10a, 10b and 11.

For the purpose of collecting the distillate from the condenser coils, common troughs 8, 8 are provided as shown in FIG. 3 on either side of the brine trays just beneath the condenser banks. Of course, it is not new in the solar water purification systems to locate distillate collecting troughs on either side of a brine tray. See Report PB–161,393, Department of Interior, page 13; and Report AD–275326, University of Arizona, Apr. 1, 1962, Hodge, Solar Evaporator. However, nothing therein suggests the idea of using these trays as common collectors for a tier of brine trays where the trays are stacked one above the other. In the solar evaporator the problem is to provide troughs for collecting distillate from the two sides of a peaked roof. In the present case, the reason for employing two collection troughs is to permit collection while providing adequate surface of flashing brine and maintaining vapor flow velocity sufficiently low to prevent passage and collection of salt-containing spray from the brine trays.

In this arrangement, raw sea water enters the rear end of the shell 1 through twin conduits 9, 9 that feed headers 11 of the heat rejection section of the evaporator. The sea water travels up the heat rejection section through the horizontal tubes of the condenser banks 6, 6 from stage to stage absorbing heat from the vapors produced by the flashing of the brine flowing in trays 2, 2, countercurrent thereto. After flowing through six stages the warmed sea water from the condensers serving the lower trays enters discharge headers 10b, passes through opening 32 as shown by the arrow and collects in the sea water return reservoir 12. The warmer sea water from the condenser banks serving the two upper trays passes into header 10a, and serves as the fresh make-up water to be added to the recycled feed from the lower brine trays 2. The warmer sea water travels from header 10a through conduit 13 of FIG. 1 to the deaerator 14, being treated on the way with sulfuric acid, which is injected into conduit 13 by an acid pump (not shown), using acid inlet pipe 13a. The deaerator may be of any standard type, such as those using a series of perforated plates over which the water cascades. Non-condensible gases are removed by a suitable vacuum pump which may be of the motor-driven type or the steam jet ejector type 15 as shown. If the latter type is used, steam is introduced in one end of the ejector 15 which takes the form of a venturi and this removes, through suction, $CO_2$, $O_2$ and any water vapor, as shown by the arrow. The exit tube 16 communicates with condenser 16a. The tube type condenser 16a is employed to recover condensed steam vapor in the exhaust from tube 16 as it condenses on the walls of the condenser tubes 16a which are cooled by the water from conduit 13 passing therethrough and out of the collecting chamber through opening 20. This water becomes part of the product or is tapped off at 14′ as it is condensed on the walls of the tubes of condenser 16a and collects in the waste chamber of the deaerator 14.

The deaerator 14 may be of conventional acid resistant construction. A pool of liquid is maintained in the collecting chamber of the deaerator 14 by weir 21 that acts to raise the liquid level and close opening 20, isolating the interior of the deaerator 14 from the shell 1, and providing a liquid lock. Overflow from weir 21 enters chamber 17 where it is mixed with the spent brine from the trays of the last stage to form the make-up for the recycle. However, this does not include the spent brine from the upper brine trays, since it enters "blow down" conduit 31, as shown by the arrows in FIG. 1, and then passes to waste water reservoir 12 where it accumulates with water from header 10b and is returned to the sea or other source. The make-up feed flows from chamber 17 to reservoir 22 or in the alternative to twin reservoirs on either side of the shell, and is pumped through conduit 24, or twin conduits, as desired, to vertical header 19 or twin headers 19, 19 on either side of the shell, as desired, to supply cooling liquid for the condenser banks 7, 7 that extend forward through the heat recovery stages. Twin headers 27, 27 at the forward end of shell 1 receive the warm liquid from the condenser banks at say 190° F. and pass it to the brine heater (not shown) which is supplied with steam from any source of low temperature energy. In the preferred embodiment, steam from a nuclear reactor may pass to a turbogenerator and produce electric power, and the spent steam from the turbine exhaust at say 230° F. is supplied to the brine heater. After being heated in the brine heater to say 210° F., brine is returned to the evaporator through line 28 to vertical header 18 which communicates with and supplies hot brine to the brine trays 2.

In its operation, hot brine enters through conduit 28 and header 18. It flows into the brine trays at various levels in the shell 1. It then flows along the brine trays in parallel paths from stage to stage. Flow is induced by the fact that each succeeding stage is maintained at a progressively lower pressure by reason of the lower condenser temperature at that stage. Each time it enters a new stage through opening 4 in the partition, it flashes upon encountering the lower pressure. The resulting vapor comes into contact with the condenser banks 7, 7 in the heat recovery section, and 6, 6 in the heat rejection section, condensing on the tubes thereof and dropping to the common trough 8 on either side of the trays 2. Opening 4' in the partitions 3, at the floor of the shell, permits continuous flow of the distillate through the shell 1 in passages 8, 8 and weirs 5' raise the level of the liquid in the trough above the opening 4' and provide a liquid lock to isolate the stages from each other. Similar passages and weirs 2' conduct flashing brine, forming the lowest brine tray.

Simultaneous with the flow of brine through the stages toward the back of the shell 1, the recirculated brine flows up the condenser banks through the stages of the heat transfer section. The temperature is progressively raised from stage to stage, as it moves toward the brine heater by absorbing heat from the condensing vapors therein.

The purified liquid in the collecting troughs continuously flows out through twin conduits 29, 29 at the rear of the shell on either side of the brine trays 2 and is collected in header 30 that communicates with a water storage reservoir (not shown).

Having thus described my invention, I claim:

1. A multistage-multilevel evaporator comprising a concrete shell defining a chamber, a plurality of trays disposed in both vertically stacked arrays and in longitudinal rows in said chamber, means for distributing heated brine for flashing to each of said trays to flow from one end longitudinally to the other end of said chamber, a plurality of condenser tubes disposed in tube banks on opposite lateral sides of and spaced apart from said trays and extending from above the topmost tray row to the bottommost tray row in said arrays, means for pumping cooling sea water through said tube banks from said other end to said one end at least one channel in the bottom of said shell for collecting condensed flush vapor by gravity from the surfaces of said coils, a plurality of transverse downwardly extending vertical baffles aligned to divide said chamber into a series of longitudinally separated compartments of gradually decreasing temperature and pressure, said baffles depending from the shell roof and the bottom of said trays to a point below the normal trays level in the liquid therebelow, a plurality of upstanding vertical baffles carried by the bottoms of said trays and the floor of said shell, said last-named baffles being coplanar vertically and being offset downstream from said downwardly-extending baffles to form weirs for said liquid between compartments, means for collecting brine from the ends downstream of said trays for partial recycling, and means to collect said condensed vapor connected to the last of said compartments.

2. A multistage-multilevel flash evaporating system wherein the flash trays of each stage are stacked in vertical arrays and in longitudinal rows in a common chamber of a concrete shell comprising a plurality of heat recovery stages connected in longitudinal series relation to define a heat recovery section, a plurality of heat rejection stages fed by the heat recovery section and connected to define a heat rejection section, condenser tubes extending the length of the heat recovery section and positioned adjacent the flash trays of each stage on either side thereof for the passage of cool feed therethrough countercurrent to the flow of hot brine in the trays to condense the vapors from the hot brine, a common trough in the bottom of the shell on either side of the trays beneath the condenser tubes to collect the condensate therefrom additional condenser tubes extending the length of the heat rejection section and positioned adjacent the flash trays, means for feding raw water to be treated through the condenser tubes of the heat rejection section and causing said raw water to flow countercurrent to the flow in the flash trays to heat the raw water through indirect contact with condensing flash vapors on the condenser tubes, means for separating the raw water discharge from the tubes that serve to condense vapors from the upper flash trays of the heat rejection section and mixing said discharge with the spent brine from the flash trays of the heat rejection section and provide recycle feed for the system, and means for discharging the water from the other lower condenser tubes of the heat rejection section as waste.

References Cited

UNITED STATES PATENTS

| Re. 25,232 | 8/1952 | Goeldner | 202—173 |
| 3,146,177 | 8/1964 | Chalmers et al. | 159—2 X |
| 3,213,000 | 10/1965 | Ewing | 159—2 X |
| 3,228,859 | 1/1966 | Frankel et al. | 159—2 X |

FOREIGN PATENTS

| 829,036 | 2/1960 | Great Britain. |
| 855,550 | 12/1960 | Great Britain. |

OTHER REFERENCES

Frankel, "Flash Evaporators for the Distillation of Seawater," The Institution of Mechanical Engineers, 1 Birdcage Walk, Westminster, London SW. 1, Dec. 9, 1959, pp. 9–11 (including plates): 203–88.

NORMAN YUDKOFF, *Primary Examiner.*

J. SOFER, *Assistant Examiner.*

UNITED STATES PATENT OFFICE
CERTIFICATE OF CORRECTION

Patent No. 3,342,697					September 19, 1967

Roland P. Hammond

It is hereby certified that error appears in the above numbered patent requiring correction and that the said Letters Patent should read as corrected below.

Column 5, line 65, for "coils" read -- tube banks --; column 6, line 6, for "trays" read -- liquid --; same line 6, for "liquid" read -- trays --; same column 6, line 12, for "ends downstream" read -- downstream ends --.

Signed and sealed this 3rd day of December 1968.

(SEAL)
Attest:

Edward M. Fletcher, Jr.					EDWARD J. BRENNER
Attesting Officer					Commissioner of Patents